(12) United States Patent
Childs

(10) Patent No.: US 11,006,512 B2
(45) Date of Patent: May 11, 2021

(54) ELECTRODE ASSEMBLY FOR PLASMA GENERATION

(71) Applicant: Montgomery William Childs, Oro Medente (CA)

(72) Inventor: Montgomery William Childs, Oro Medente (CA)

(73) Assignee: Aureon Energy Ltd., Oro-Medonte (CA)

( * ) Notice: Subject to any disclaimer, the term of this patent is extended or adjusted under 35 U.S.C. 154(b) by 0 days.

(21) Appl. No.: 16/105,190

(22) Filed: Aug. 20, 2018

(65) Prior Publication Data

US 2019/0059149 A1     Feb. 21, 2019

Related U.S. Application Data

(60) Provisional application No. 62/547,432, filed on Aug. 18, 2017.

(51) Int. Cl.
*H05H 1/50*     (2006.01)
*H05H 1/48*     (2006.01)
(Continued)

(52) U.S. Cl.
CPC ............... *H05H 1/50* (2013.01); *H05H 1/24* (2013.01); *H05H 1/26* (2013.01); *H05H 1/48* (2013.01); *H05H 2001/481* (2013.01)

(58) Field of Classification Search
CPC .... H05H 1/24; H05H 1/50; H05H 2001/2443; H05H 2001/466; H05H 2245/122;
(Continued)

(56) References Cited

U.S. PATENT DOCUMENTS 3,684,911 A * 8/1972 Perugini ................ B05B 7/226
                                                          219/121.47
4,933,060 A     6/1990 Prohaska
(Continued)

FOREIGN PATENT DOCUMENTS

JP         2008178870 A  *   8/2008
WO     WO-2007089061 A1  *   8/2007 ........... H05H 1/2406

OTHER PUBLICATIONS

W Lowell Morgan and Montgomery W Childs; Study of Striations in a Spherically symmetric hydrogen discharge; Plasma Sources Science Technology; Sep. 23-24, 2015, pp. 1-9.
(Continued)

*Primary Examiner* — Vibol Tan
(74) *Attorney, Agent, or Firm* — Eugene F. Derényi; Fogler, Rubinoff LLP

(57) ABSTRACT

A hollow electrode assembly through which gas from a gas supply can pass and be effused across the casing of the electrode for supplying a gas for a plasma discharge. The gas passing the electrode goes from a higher gas pressure environment inside the electrode to a lower gas pressure environment on the outside of the electrode. The casing of the electrode through which the gas effuses can be a metal or metal allow which provides for a controlled flow of the gas through the wall. The flow rate of the gas can be controlled by one or more of the porosity of the metal or metal alloy used, the type of gas used, the pressure differential between the inside and outside of the electrode, and the temperature of the system. The electrode assembly can be used in and high temperature plasma generators.

20 Claims, 8 Drawing Sheets

(51) Int. Cl.
*H05H 1/24* (2006.01)
*H05H 1/26* (2006.01)

(58) Field of Classification Search
CPC ........ H05H 1/26; A61B 18/042; C01B 3/503;
C23C 4/134; Y10S 422/906; B01J
19/2475; B01D 65/003; C04B 41/0054
See application file for complete search history.

(56) References Cited

U.S. PATENT DOCUMENTS

| | | | |
|---|---|---|---|
| 5,359,966 A | 11/1994 | Jensen | |
| 5,623,148 A | 4/1997 | Wenzel | |
| 5,685,997 A | 11/1997 | LoPresti | |
| 5,698,168 A * | 12/1997 | Priddy | C23C 14/0026 422/186.29 |
| 6,380,268 B1 | 4/2002 | Yakobson et al. | |
| 6,525,481 B1 * | 2/2003 | Klima; Milos | H05H 1/30 315/111.21 |
| 7,557,511 B2 | 7/2009 | Strikovski | |
| 7,839,499 B2 * | 11/2010 | Duan | G01J 3/30 356/316 |
| 7,849,815 B2 * | 12/2010 | Osada | C23C 16/26 118/723 E |
| 8,474,724 B2 * | 7/2013 | Theile | G06F 13/385 235/472.01 |
| 2002/0179428 A1 | 12/2002 | Anazawa | |
| 2006/0054501 A1 * | 3/2006 | Jiang | E21B 49/10 204/409 |
| 2009/0068375 A1 * | 3/2009 | Dobbyn | B05D 1/62 427/489 |
| 2009/0068485 A1 * | 3/2009 | Inaoka | C08F 220/34 428/481 |
| 2009/0201500 A1 * | 8/2009 | Duan | G01J 3/30 356/316 |
| 2010/0125267 A1 * | 5/2010 | Lee | A61B 18/042 606/27 |
| 2011/0239542 A1 * | 10/2011 | Liu | B01J 19/088 48/127.5 |
| 2011/0309050 A1 | 12/2011 | Kazuyuki | |
| 2013/0309416 A1 * | 11/2013 | Yokoyama | C23C 16/4412 427/569 |
| 2017/0189349 A1 * | 7/2017 | Roe | A61N 1/44 |
| 2017/0291830 A1 * | 10/2017 | Kang | H05H 1/48 |
| 2018/0193816 A1 | 7/2018 | Letts | |

OTHER PUBLICATIONS

Cercek et al.; PIC Simulation of a Double Layer Formation in a Hydrogen Plasma with Negative Ions; 29th EPS Conference on Plasma Phys. and Contr. Fusion Montreux, Jun. 17-21, 2002 ECA vol. 26B, p. 2-006, pp. 1-4.
Office Action dated Jan. 4, 2019, U.S. Appl. No. 16/105,365.

* cited by examiner

ELECTRODE ASSEMBLY FOR PLASMA GENERATION

CROSS-REFERENCE TO RELATED APPLICATION

This present application claims the benefit of U.S. Provisional Patent Application Ser. No. 62/547,432 filed Aug. 18, 2017.

FIELD OF THE DISCLOSURE

The present disclosure relates generally to electrodes for plasma generation.

BACKGROUND OF THE DISCLOSURE

Electrodes are used in plasma generation such as in fusion reactors and plasma generators. Such electrodes can be connected to a power source (for use as an anode) or the ground (for use as a cathode) and placed in a plasma chamber. Overheated gas is typically supplied to the plasma discharge

SUMMARY OF THE DISCLOSURE

In one aspect, the present disclosure relates to a hollow electrode assembly including at least one conduit for the supply of fresh, non-ionized gas to a plasma discharge from the electrode. The non-ionized gas comprises ions and electrons which are thermally cooled by the assembly. The supply of gas helps to thermally cool the electrode which helps to extend the anode life of the electrode and enable longer analysis times. In certain aspects of the present disclosure, the electrode may function as an anode while in other aspects, the electrode may function as a cathode.

In another aspect, the present disclosure relates to a hollow electrode assembly including at least one conduit for the supply of fresh, non-ionized gas to a plasma discharge, and an effusion membrane through which the non-ionized gas can pass to supply the plasma discharge from the electrode.

In a still further aspect, the present disclosure relates to a hollow electrode assembly through which gas from a gas supply can pass and be effused across the casing of the electrode for supplying a gas for a plasma discharge. The gas passing the electrode goes from a higher gas pressure environment inside the electrode to a lower gas pressure environment on the outside of the electrode. In certain aspects of the present disclosure, the casing of the electrode through which the gas effuses is a metal or metal allow which provides for a controlled flow of the gas through the wall. In certain aspects of the present disclosure, the flow rate of the gas is controlled by one or more of the porosity of the metal or metal alloy used, the type of gas used, the pressure differential between the inside and outside of the electrode, and the temperature of the system. In certain aspects of the present disclosure, the electrode assembly can be used in high temperature plasma generators. In another aspect of the present disclosure, the electrode is used as an anode and the casing shields the gas inside the electrode from the ionizing plasma and impinging negative ions and electrons from a cathode. In another aspect of the present disclosure, the effusion rate of the gas through the casing into the surrounding ionizing plasma is partially governed by Sievert's law, which describes diatomic and ionizable gas solubility in a metal lattice. If a selected amount of porosity is introduced into the metal or metal allow casing during casting, Fick's law of diffusion further governs the pressure differential between the internal high pressure of the electrode and the surrounding vacuum plasma.

In another aspect, the present disclosure relates to a method for generating a plasma including providing a hollow electrode assembly through which a gas from a gas supply can pass and be effused across the casing of the electrode for supplying a gas for a plasma discharge, introducing the gas under pressure into the electrode assembly such that the gas passes and is effused across the casing, and applying a current and a voltage to the electrode assembly for generating a plasma discharge.

BRIEF DESCRIPTIONS OF DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
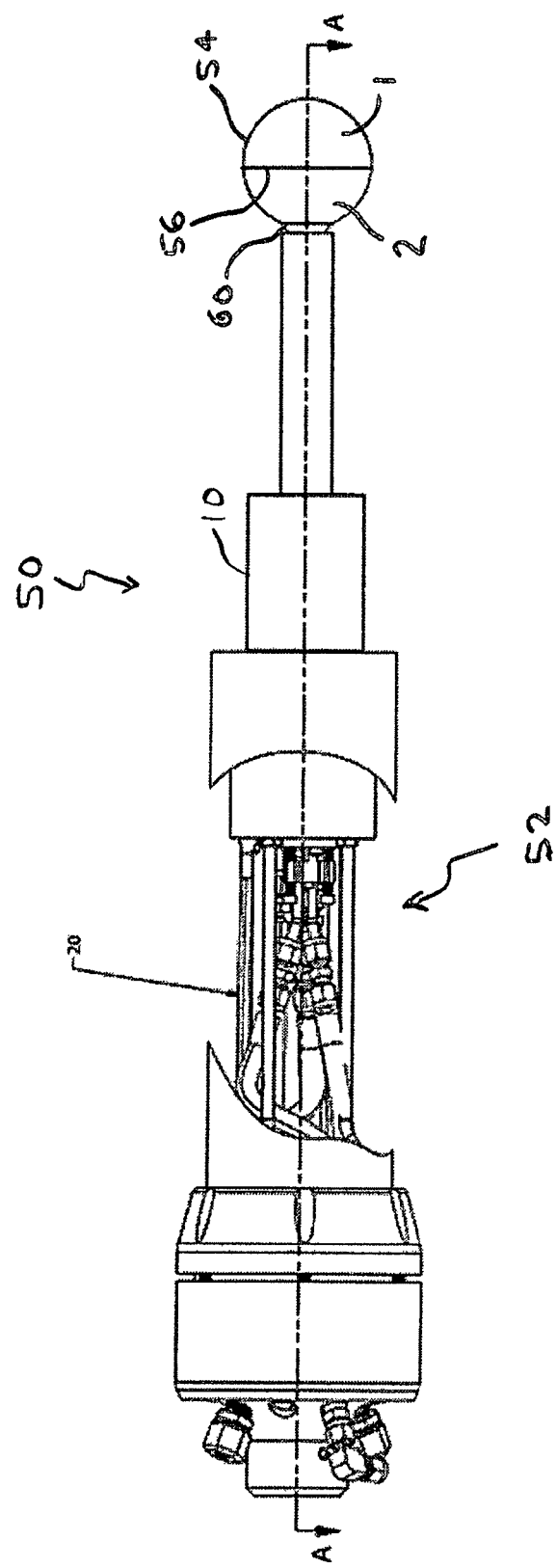
FIG. 1 is front elevation view with a partial cut-away of an anode assembly according to an aspect of the present disclosure.
Figure 1A:
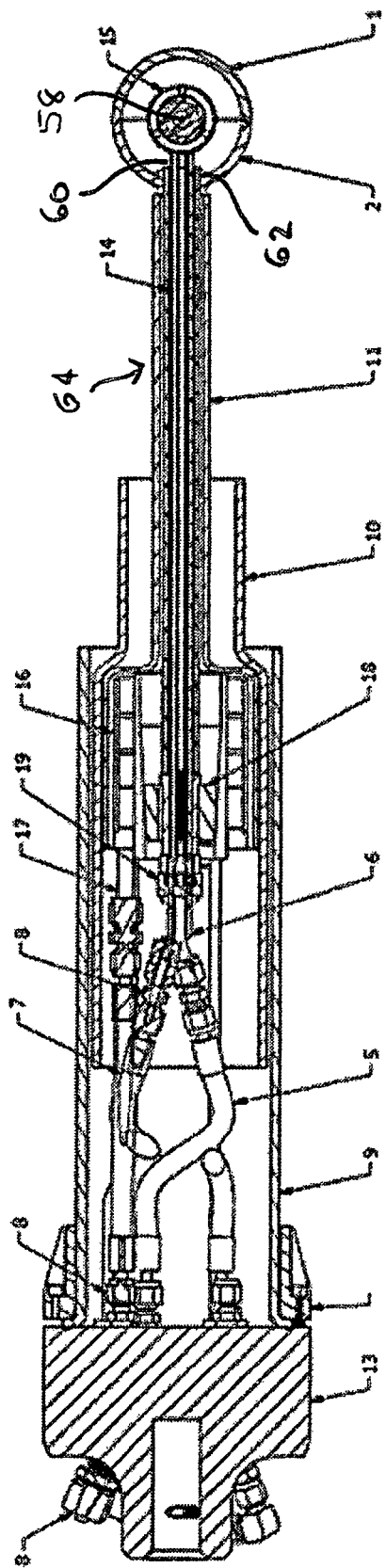
FIG. 1A is a section view taken along A-A of FIG. 1.
Figure 2:
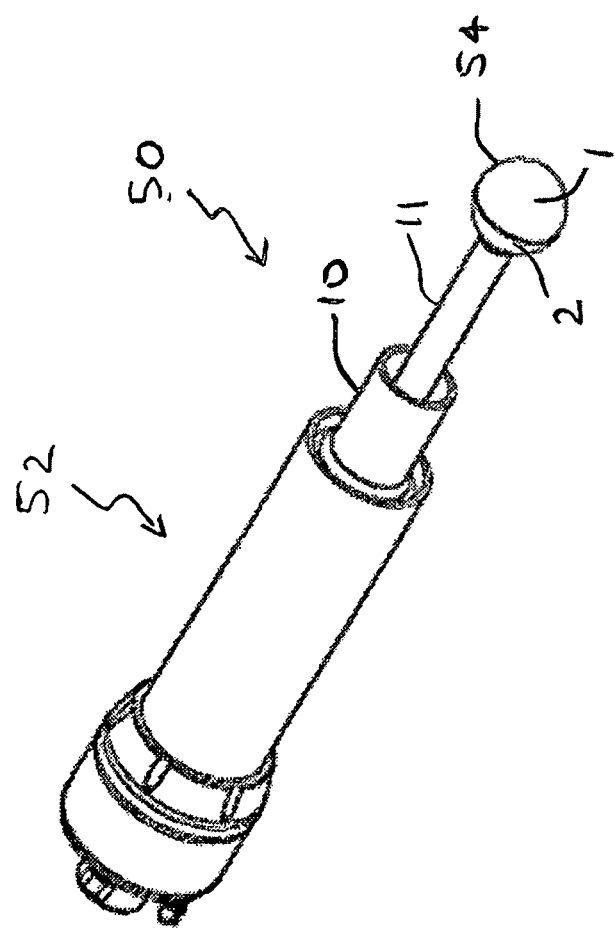
FIG. 2 is an isometric view of the anode assembly of FIG. 1.
Figure 3:
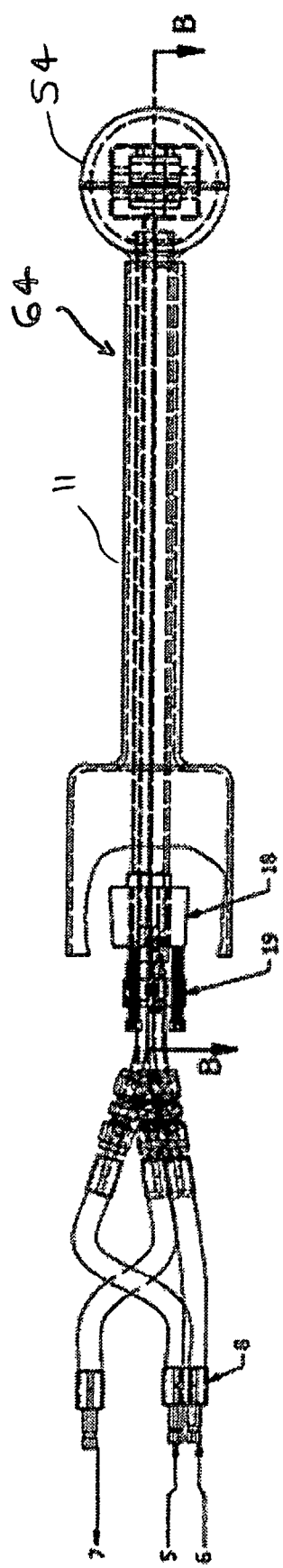
FIG. 3 is a front elevation view of the anode head of the anode and sleeve of FIG. 1.
Figure 3A:
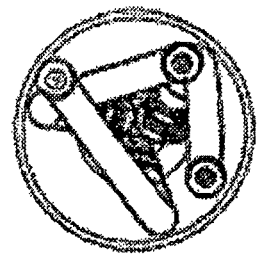
FIG. 3A is a left side elevation view of the anode head and sleeve of FIG. 3.
Figure 3B:
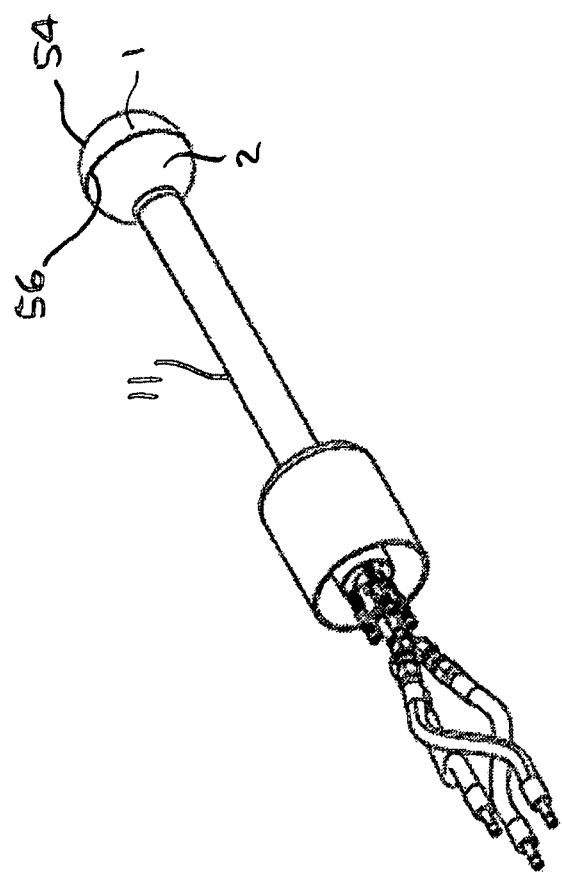
FIG. 3B is an isometric view of the anode and sleeve of FIG. 3.
Figure 4:
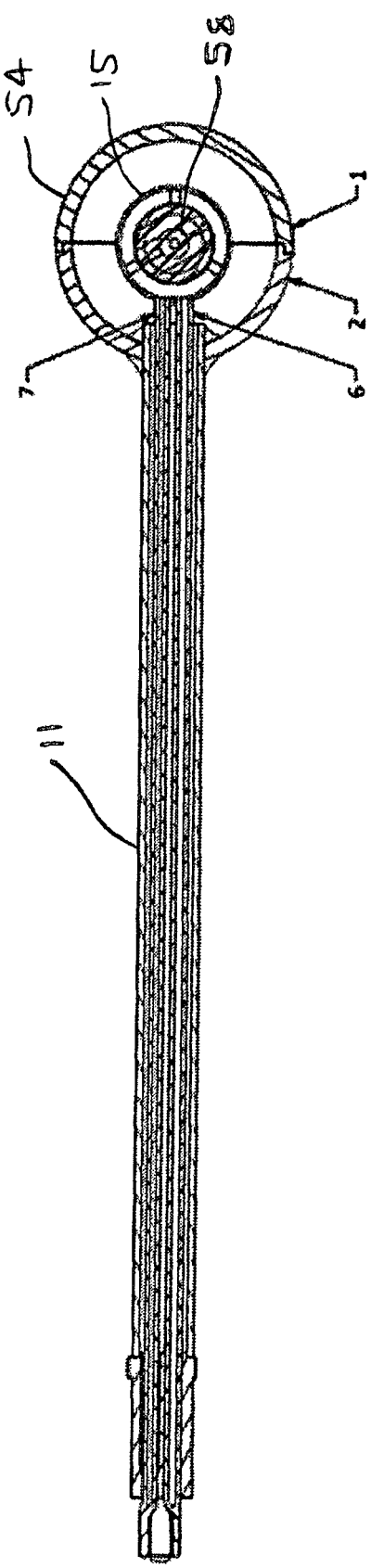
FIG. 4 is a section view of the anode of FIG. 3 taken along B-B of FIG. 3.
Figure 4A:
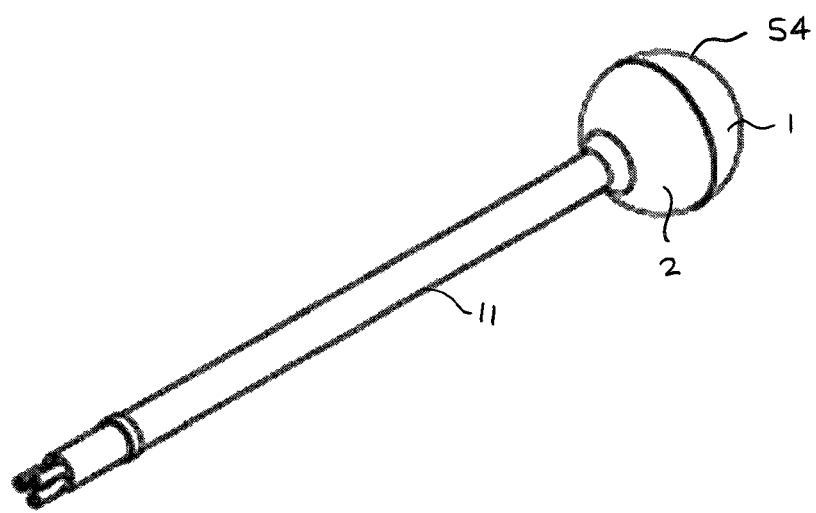
FIG. 4A is an isometric view of the anode of FIG. 4.

Referring initially to FIG. 1, in one implementation, the present disclosure is directed to an electrode assembly including an anode generally indicated at 50 and a gas delivery and cooling assembly generally indicated at 52. The anode 50 includes a hollow bulbous head 54. The anode head 54 includes two cast alloy half spheres 1, 2 welded together along seam 56. The alloy is a steel-based alloy with high nickel content (above ~20%) but other metals and/or alloys suitable for plasma generation can be used. In certain embodiments, any metal that is castable with porosity can be used. In still further embodiments, noble metals such as palladium, platinum, nickel, etc., may be used since hydrogen dissolves in the lattice and can diffuse from a higher pressure within the anode to the surrounding chamber. Housed in the bulbous head 54 is magnetic core 15 which houses a magnet 58. The magnet 58 may be an electromagnet or permanent magnet which can be used to further customize the plasma characteristics. The charged plasma will follow the field lines from the magnet to the surface of the anode. The magnetic core 15 is located at the free end of inner sleeve 60 which enters the bulbous head 54 through opening 62 is half sphere 2. Sleeve 60 houses conduits indicated generally at 64 that include gas inlet, coolant inlet, and coolant outlet The sleeve 60 is enclosed by insulated outer sleeve 11.

The sleeves 60 and 62 and conduits 64 extend into insulated sleeve 10 and then insulated sleeve 9 of the gas delivery and cooling assembly 52. The sleeve 9 houses multi-anode tube flow-throughs 19, anode water cooling lines 5, 6 and gas input line 7 which are coupled together by tube unions 8 to internal gas/water cooling lines 14 in order to maintain gas/water pressure and flow. In this manner, in operation, the bulbous anode head 1 remains energized at high electrical potential with no arcing to grounded inlet lines 5, 6, 7. The gas inlet 7 is connected to a pressure gauge and subsequent gas sources. The tapered base 18 ensures the anode assembly is a tight fit to the positive high voltage/high current circuit while allowing multiple styles of anode electrode to be interchanged.

Electrical charge is delivered via an insulated cable 20 coupled to the multi-anode base/heat exchanger unit 16. Pressurized cooling lines 17 are connected to the multi-anode base/heat exchanger to maintain cooling of the anode and insulated properties.

Insulated sleeves 9, 10, 11 are utilized to increase arc distance to ground and insulate components from heat.

In order to further insulate the parts from the high electrical potential when the bulbous head 54 operates as an anode, a polymer bulkhead 13 is used in transition from the gas/cooling/electrical supply-side. Dielectric materials are used whenever possible to prevent discharges across gaps to electrical ground. PEEK polymer, glass, quartz, and refractory materials are common constituents to accomplish such a task. The gas can be any gas, but in this embodiment discharges using hydrogen and deuterium are disclosed. Because of the extremely high temperatures encountered, cooling water lines are distributed throughout the electrode assembly which further strengthen the original nature of this design.

EXAMPLES

Example 1

Figure 5:
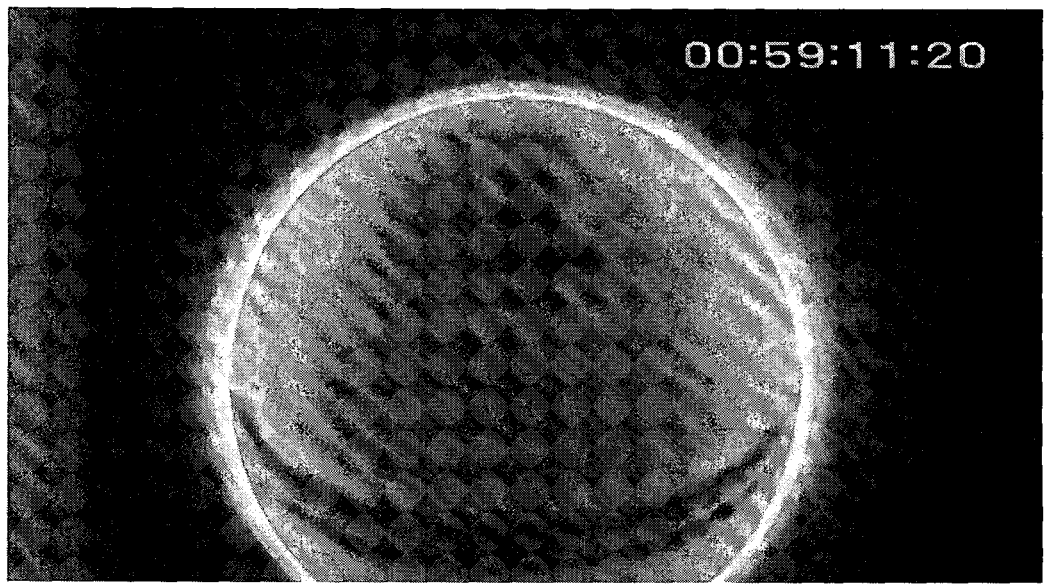
FIG. 5 is an image of the head of a steel anode according to an aspect of the present disclosure with a high-voltage discharge on the head. The dark striations are the weld seams.

FIG. 5 shows a typical electrical discharge in 5 torr hydrogen (chamber pressure) and 200 psi (13.8 kbar) being exerted from the source gas in the anode with a discharge voltage of 300V.

Example 2

Figure 6:
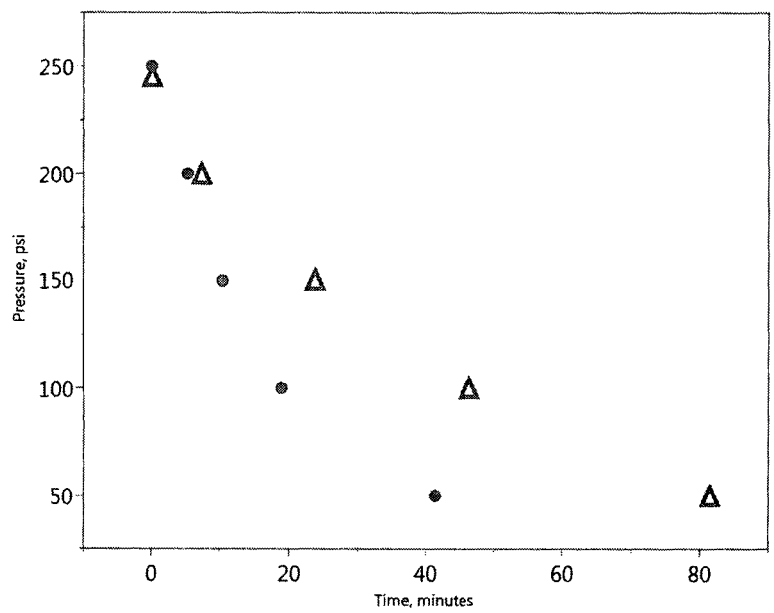
FIG. 6 is a graph of the pressure within the anode of FIG. 5 as a function of time when initially charged with (●) hydrogen and (Δ) nitrogen and then the source gas shut off.

FIG. 6 shows the pressure decay as a function of time for a charged anode surrounded by 1 torr of atmosphere of hydrogen, and a separate experiment with nitrogen. The anode was charged with 250 psi of gas, and the supply valve then closed.

Accordingly, the present disclosure should only be limited by the scope of the claims that follow.

What is claimed is:

1. An electrode apparatus for plasma generation comprising:
an electrode assembly including a hollow electrode connectable to a gas source, comprising,
at least one conduit in the electrode assembly for supplying gas under pressure to the inside of the hollow electrode, and
a gas permeable membrane on the hollow electrode for permitting gas from inside the hollow electrode to effuse across the gas permeable membrane for supplying gas to a plasma discharge from the hollow electrode,
wherein the hollow electrode further comprises a plasma discharge head from which the plasma is discharged from the hollow electrode, and
wherein the geometry of the head is selected from the group consisting of a bulb, sphere, polyhedral, tetrahedral, octahedral, and icosahedral.

2. An electrode apparatus for plasma generation comprising:
an electrode assembly including a hollow electrode connectable to a gas source, comprising,
at least one conduit in the electrode assembly for supplying gas under pressure to the inside of the hollow electrode, and
a gas permeable membrane on the hollow electrode for permitting gas from inside the hollow electrode to effuse across the gas permeable membrane for supplying gas to a plasma discharge from the hollow electrode,
wherein the gas permeable membrane comprising a metal matrix for dissociating diatomic molecules whereby dissociated atomic species effuse through the metal matrix and recombine within a plasma corona above the surface of the metal electrode.

3. An electrode apparatus for plasma generation comprising:
an electrode assembly including a hollow electrode connectable to a gas source, comprising,
at least one conduit in the electrode assembly for supplying gas under pressure to the inside of the hollow electrode, and
a gas permeable membrane on the hollow electrode for permitting gas from inside the hollow electrode to effuse across the gas permeable membrane for supplying gas to a plasma discharge from the hollow electrode,
the electrode assembly further comprising an electrical circuit in a tapered housing.

4. The electrode apparatus of claim 2, the hollow electrode further comprising a magnet therein for proving field lines to guide plasma formation, and wherein the metal matrix provides for gas effusion at a constant rate to the environment surrounding the hollow electrode at a lower pressure as compared to the pressure of the environment inside the hollow electrode.

5. The electrode apparatus of claim 4, wherein the magnet is a rare-earth neodymium, samarium-cobalt, or pure ferromagnet, comprised of compositions containing neodymium, iron, and/or boron, or samarium and cobalt.

6. The electrode apparatus of claim 4, wherein the magnet is an electromagnet, the magnetic field of which can be controlled by an electrical current through a particular design of current-carrying wires or media.

7. The electrode apparatus of claim 4, wherein the magnet has a remanence strength of at least 0.0 to 1.5 tesla.

8. The electrode apparatus of claim 1, further comprising a coating on the hollow electrode for promoting a dielectric protective layer which can alter the appearance and characteristics of the plasma discharge.

9. The electrode apparatus of claim 8, wherein the coating is selected from the group consisting of lithium, potassium, sodium in the form of a refractory oxide mixture, decomposable carbonate, decomposable nitrate, a volatile material that would leave behind oxides, and reduced metals of lithium, potassium, or sodium.

10. The electrode apparatus of claim 9, wherein the refractory oxide comprises one or more transition elements of the periodic table.

11. The electrode apparatus of claim 9, wherein the refractory oxide coating comprises one or more lanthanide elements of the periodic table.

12. The electrode apparatus of claim 1, wherein the plasma discharge head forms the gas permeable membrane composed of a pure element or alloy selected from the group consisting of nickel, iron, carbon, molybdenum, chromium, vanadium, silicon, copper, palladium, platinum, lithium, aluminum, carbon and combinations thereof.

13. The electrode apparatus of claim 2, wherein the plasma discharge head forms the gas permeable membrane composed of a pure element or alloy selected from the group consisting of nickel, iron, carbon, molybdenum, chromium, vanadium, silicon, copper, palladium, platinum, lithium, aluminum, carbon and combinations thereof.

14. The electrode apparatus of claim 3, wherein the plasma discharge head forms the gas permeable membrane composed of a pure element or alloy selected from the group consisting of nickel, iron, carbon, molybdenum, chromium, vanadium, silicon, copper, palladium, platinum, lithium, aluminum, carbon and combinations thereof.

15. The electrode apparatus of claim 1, the hollow electrode further comprising a magnet therein for proving field lines to guide plasma formation, and wherein the metal matrix provides for gas effusion at a constant rate to the environment surrounding the hollow electrode at a lower pressure as compared to the pressure of the environment inside the hollow electrode.

16. The electrode apparatus of claim 15, wherein the magnet is a rare-earth neodymium, samarium-cobalt, or pure ferromagnet, comprised of compositions containing neodymium, iron, and/or boron, or samarium and cobalt.

17. The electrode apparatus of claim 15, wherein the magnet is an electromagnet, the magnetic field of which can be controlled by an electrical current through a particular design of current-carrying wires or media.

18. The electrode apparatus of claim 3, the hollow electrode further comprising a magnet therein for proving field lines to guide plasma formation, and wherein the metal matrix provides for gas effusion at a constant rate to the environment surrounding the hollow electrode at a lower pressure as compared to the pressure of the environment inside the hollow electrode.

19. The electrode apparatus of claim 17, wherein the magnet is a rare-earth neodymium, samarium-cobalt, or pure ferromagnet, comprised of compositions containing neodymium, iron, and/or boron, or samarium and cobalt.

20. The electrode apparatus of claim 17, wherein the magnet is an electromagnet, the magnetic field of which can be controlled by an electrical current through a particular design of current-carrying wires or media.

* * * * *